(12) United States Patent
Glaab

(10) Patent No.: US 7,614,645 B2
(45) Date of Patent: Nov. 10, 2009

(54) AIRBAG MODULE

(75) Inventor: Ralf Glaab, Krombach (DE)

(73) Assignee: Takata-Petri AG, Aschaffenburg (DE)

( * ) Notice: Subject to any disclaimer, the term of this patent is extended or adjusted under 35 U.S.C. 154(b) by 11 days.

(21) Appl. No.: 11/889,010

(22) Filed: Aug. 8, 2007

(65) Prior Publication Data

US 2007/0278769 A1    Dec. 6, 2007

Related U.S. Application Data

(63) Continuation of application No. PCT/DE2006/000229, filed on Feb. 7, 2006.

(30) Foreign Application Priority Data

Feb. 9, 2005    (DE) ............... 20 2005 002 329

(51) Int. Cl.
*B60R 21/20*    (2006.01)
*B60R 21/217*    (2006.01)

(52) U.S. Cl. ............... 280/728.2; 280/741; 280/743.1; 280/739

(58) Field of Classification Search ............ 280/728.2, 280/741, 743.1, 739
See application file for complete search history.

(56) References Cited

U.S. PATENT DOCUMENTS

| | | | |
|---|---|---|---|
| 3,799,575 A | 3/1974 | Kurze et al. | |
| 3,810,654 A | 5/1974 | DeBano, Jr. et al. | |
| 4,153,273 A | 5/1979 | Risko | |
| 4,332,398 A | 6/1982 | Smith | |
| 5,605,347 A * | 2/1997 | Karlow et al. | 280/728.2 |
| 5,613,704 A * | 3/1997 | White et al. | 280/740 |
| 5,632,506 A | 5/1997 | Shellabarger | |
| 5,803,488 A * | 9/1998 | Bailey et al. | 280/728.2 |
| 5,833,266 A * | 11/1998 | Bartoldus et al. | 280/743.1 |
| 5,836,607 A * | 11/1998 | Wallner | 280/728.2 |
| 6,106,000 A * | 8/2000 | Stewart | 280/728.2 |
| 6,168,185 B1 | 1/2001 | Ross | |
| 6,183,003 B1 | 2/2001 | Matsuhashi et al. | |
| 6,846,005 B2 * | 1/2005 | Ford et al. | 280/728.2 |

(Continued)

FOREIGN PATENT DOCUMENTS

DE    195 10 383 A1    9/1995

(Continued)

OTHER PUBLICATIONS

Opposition Brief dated Apr. 18, 2008, which issued in the parallel European Patent Application No. 06705948.5.

*Primary Examiner*—D. Glenn Dayoan
*Assistant Examiner*—George D. Spisich
(74) *Attorney, Agent, or Firm*—Foley & Lardner LLP

(57) ABSTRACT

An airbag module comprises a gas generator provided with an electrical connection and an airbag provided with a gas generator opening. The gas generator opening is used to introduce the gas from the gas generator into the airbag and can be sealed with at least one fabric element. The gas generator and the electrical connection are arranged in the region of the gas generator opening. The at least one fabric element is arranged and embodied in such a way that the gas generator opening is sealed by the at least one fabric element during and/or following the airbag deployment in the region of the gas generator and/or the on the electrical connection.

3 Claims, 5 Drawing Sheets

U.S. PATENT DOCUMENTS

| | | | |
|---|---|---|---|
| 2003/0006587 A1* | 1/2003 | Jang et al. ................ | 280/730.2 |
| 2004/0183282 A1 | 9/2004 | Schneider et al. | |
| 2005/0073134 A1 | 4/2005 | Matsuura et al. | |
| 2006/0006630 A1 | 1/2006 | Schwarz | |

FOREIGN PATENT DOCUMENTS

| | | |
|---|---|---|
| DE | 197 34 167 A1 | 2/1999 |
| DE | 198 01 125 A1 | 7/1999 |
| DE | 103 32 594 A1 | 3/2004 |
| DE | 20 2004 000 170 U1 | 5/2004 |
| DE | 20 2004 010 785 U1 | 12/2004 |
| EP | 0 633 168 B1 | 1/1995 |
| EP | 0 844 144 A1 | 5/1998 |
| EP | 1 359 064 A2 | 11/2003 |

* cited by examiner (A)

(B)

(C)

(D)

(E)

AIRBAG MODULE

CROSS-REFERENCE TO RELATED PATENT APPLICATIONS

This application is a continuation of International Application PCT/DE 2006/000229, which has an international filing date of Feb. 7, 2006; this International Application was not published in English, but was published in German as WO 2006/084449, both of which are incorporated by reference herein in their entirety.

BACKGROUND

The invention relates to an airbag module comprising a gas generator and an airbag.

In the case of airbag modules, it is known to arrange the gas generator within the airbag. Thus, an airbag module is known from EP 0 633 168 B1 (which is incorporated by reference herein in its entirety), in which a tubular gas generator is provided in the airbag in a pocket which, at its lower end, has an opening in the form of tabs which overlap in the manner of a labyrinth and are sewn to the side edges. The pocket has reinforcements on the end sides. The reinforcement on one end side has an opening with a cross section which approximately corresponds to the cross section of the tubular gas generator. This opening is tightly closed by a flange on the tubular gas generator after installation of the latter. The reinforcement on the other end side has an opening with a cross section which approximately corresponds to the cross section of a fastening bolt on the tubular gas generator. This opening is closed after installation of said tubular gas generator by means of a nut with a sealing ring. The electrical connecting cable of the tubular gas generator is guided on the flange side thereof out of the airbag. The disadvantage of this arrangement is that the fastening and covering on the flange side are complicated and lead to a high outlay on material and installation.

An airbag device is known from DE 195 10 383 A1 (which is incorporated by reference herein in its entirety), in which an airbag has a main opening which permits a gas generator to be introduced into said airbag, and a secondary opening through which an electrical connection between the gas generator and a power source is made possible. In this case, the main opening acts as a vent hole in order to allow the gas generated by the gas generator to emerge from the airbag. This main opening is provided laterally in a lower part of the airbag. The secondary opening is provided centrally in the lower part of the airbag. The gas generator is fastened at this point to a baseplate.

The disadvantage of this arrangement is that there are two openings for the gas generator in the airbag, the first serving for the introduction of the gas generator and the second being provided for guiding the electrical connection out.

SUMMARY

One exemplary embodiment provides an airbag module. The airbag module comprises a gas generator including an electrical connection, an airbag including a gas generator opening for introducing the gas generator into the airbag, and at least one fabric part. The gas generator opening is positioned at a region of the gas generator such that prior to inflation the opening is over a section of the gas generator including an electrical connection. The gas generator opening can be sealed by the at least one fabric part. The gas generator and the electrical connection are arranged in a region of the gas generator opening. The at least one fabric part is arranged such that sealing of the gas generator opening by the at least one fabric part occurs during and/or after the deployment of the airbag.

Another exemplary embodiment provides an airbag module. The airbag module comprises a tubular gas generator including an electrical connection, an airbag with a generator opening, at least one fabric part attached to the airbag. The gas generator is inserted into the airbag via the generator opening. A portion of the gas generator protrudes out of the generator opening after installation of the gas generator and when the airbag is in a folded state. The electrical connection protrudes out of the generator opening after installation of the gas generator and when the airbag is in the folded state. During inflation of the airbag, the at least one fabric part seals the generator opening.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
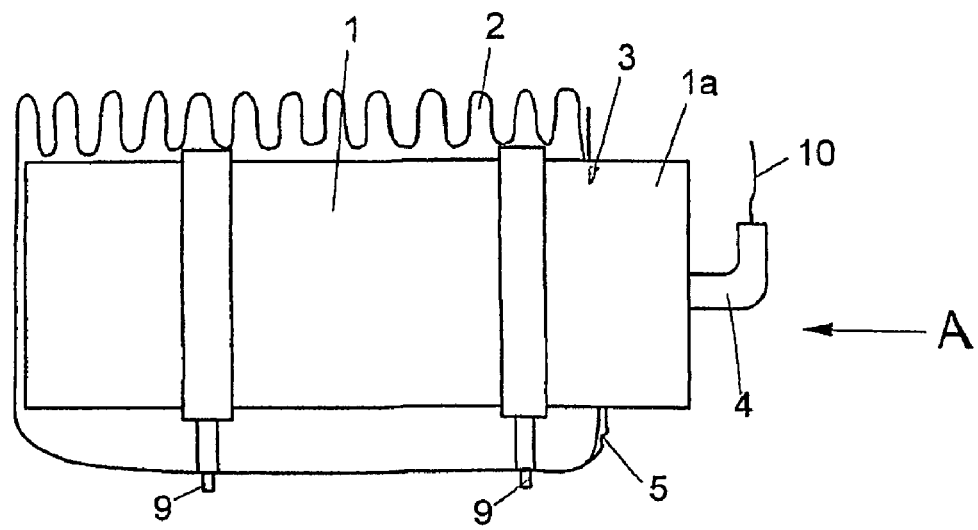
FIG. 1 shows a section through a folded airbag with a fabric part for covering a gas generator opening.

An object of exemplary embodiments is to simplify the construction of an airbag module.

In the case of an airbag comprising a gas generator which has an electrical connection and comprising an airbag which has a gas generator opening for introducing the gas generator into the airbag, the gas generator opening being able to be sealed by at least one fabric part, the gas generator and its electrical connection are arranged in the region of the gas generator opening and the at least one fabric part is arranged and designed in such a manner that the sealing of the gas generator opening by the at least one fabric part takes place in the region of the gas generator and/or on the electrical connection during or after the deployment of the airbag.

In this arrangement according to an embodiment, there is an advantage of not requiring a special opening to guide the electrical connection of the gas generator out of the airbag. A further advantage is that the gas generator opening is only sealed by a fabric part of the airbag, and that a flange or a leak proof screw connection is not required for this.

A first embodiment is characterized in that the gas generator is arranged, with the airbag folded, in the gas generator opening and protrudes with one section out of the airbag, in that the electrical connection of the gas generator is provided on that section of the gas generator which is situated outside the airbag, and in that the at least one fabric part covering the gas generator opening is designed in such a manner that it closes the gas generator opening behind the gas generator during and/or after deployment of the airbag, so that the gas generator lies entirely in the airbag.

In this embodiment, the gas generator therefore protrudes with the electrical connection out of the airbag before the airbag is deployed. Only during the deployment of the airbag is the airbag forced outward, until the gas generator lies completely in the airbag. During or after the deployment of the airbag, the fabric part then closes the gas generator opening behind the gas generator.

A second embodiment is characterized in that the gas generator is arranged in the airbag directly behind the gas generator opening, and in that the electrical connection of the gas generator is guided out of the airbag through the gas generator opening.

The sealing of the gas generator opening can take place by the at least one fabric part covering the gas generator opening being designed in such a manner that it bears against the electrical connection during and/or after the deployment of the airbag. In this embodiment, the fabric part remains deformed by the electrical connection.

In another embodiment, the airbag (in the region of the gas generator opening and/or a cable connector for connecting a connecting cable to the gas generator) is designed in such a manner that the cable connector is separated from the gas generator during the deployment of the airbag, so that the at least one covering fabric part closes the airbag without a component situated in-between. In this embodiment, the fabric part stops being deformed after the deployment of the airbag, i.e. it resumes the position in which it was originally sewn.

In one embodiment, the cable connector is designed in such a manner that it protrudes over the diameter of the gas generator and the airbag has an annular reinforcement in the region of the gas generator opening, the diameter of which approximately corresponds to the diameter of the gas generator. When the airbag is deployed, the edge of the gas generator opening is pressed against that section of the cable connector which protrudes over the gas generator and, because of the reinforcement, the deploying airbag is capable of pressing the cable connector out of the gas generator.

It is expedient in the embodiment that two overlapping fabric parts covering the gas generator opening are provided. It is then particularly advantageous if the fabric parts are to cover the gas generator opening at the electrical connection. In this case, the connection is enclosed on all sides by the two fabric parts.

In embodiments, a tubular gas generator which has the electrical connection on an end side can be provided as the gas generator.

Figure 2:
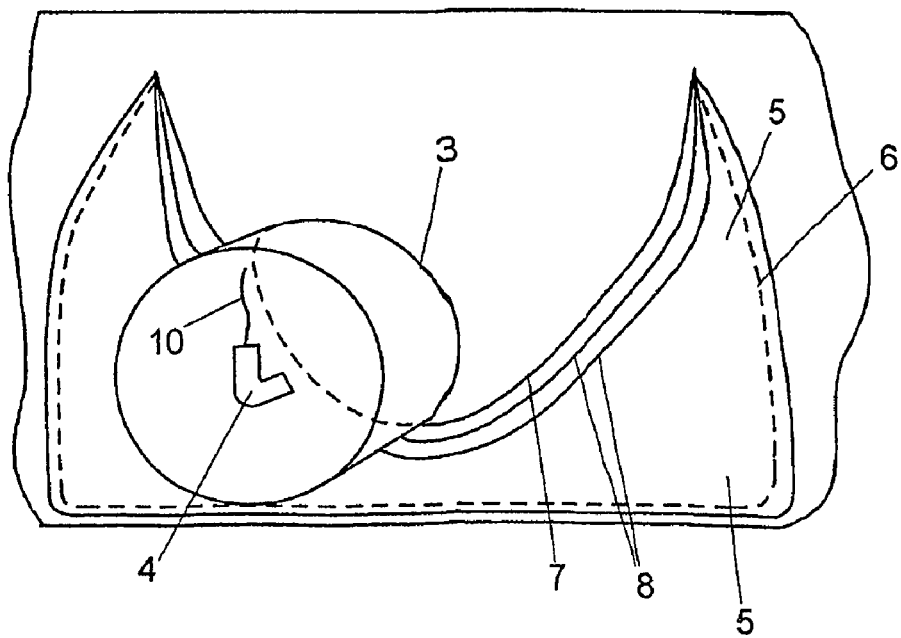
FIG. 2 shows the view A of the airbag arrangement according to FIG. 1.

The arrangement of FIG. 1 illustrates a detail from an airbag module. A tubular gas generator 1 is arranged in an airbag 2 in such a manner that it protrudes out of the airbag 2 through a gas generator opening 3. An electrical connection in the form of an appliance connector 4 and a connecting cable 10 is provided on the end side of that section 1a of the tubular gas generator 1 which protrudes out of the airbag 2. In the region of the gas generator opening 3, a fabric part 5 is provided on the outside of the airbag 2, the fabric part 5 being intended to close the gas generator opening 3 after the deployment of the airbag 2. The fabric part 5 may also be fastened to the inside of the airbag. FIG. 1 shows the airbag 2 in a folded position. As is apparent in particular from FIG. 2, the fabric part 5 is connected at the bottom and laterally to the airbag by means of seams 6. As is furthermore apparent from FIG. 2, the upper edge 7 of the fabric part 5, which upper edge is not connected to the airbag 2, is pressed downward during the installation of the tubular gas generator and, after the installation thereof, bears against the lower side thereof, with the fabric part 5 forming folds 8. The tubular gas generator is fastened to a securing device (not illustrated) in the airbag module in a manner known per se by means of bolts 9 which protrude, out of the airbag 2 at the bottom.

Figure 3:
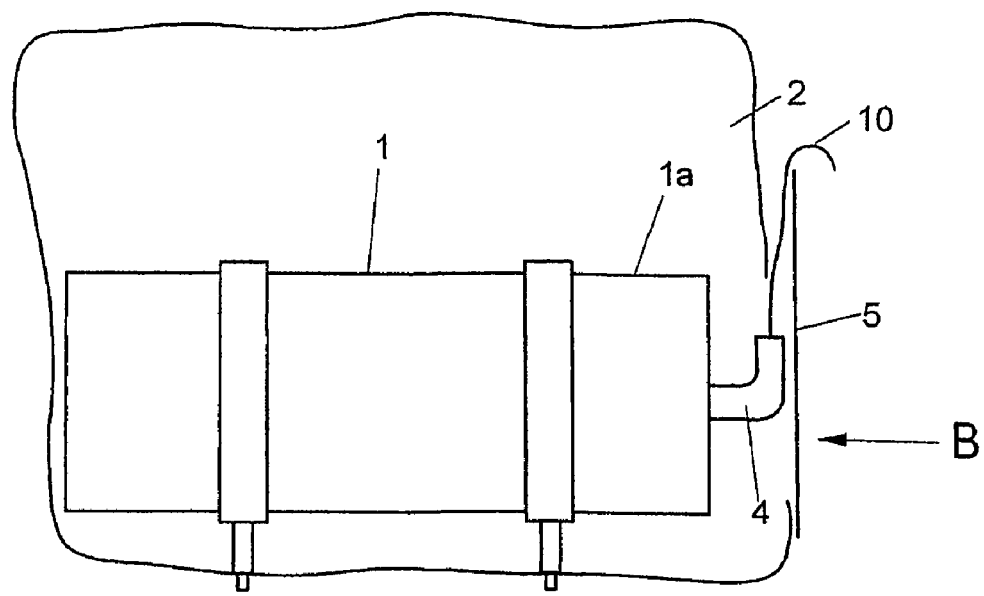
FIG. 3 shows the airbag according to FIG. 1 after deployment of the airbag.
Figure 4:
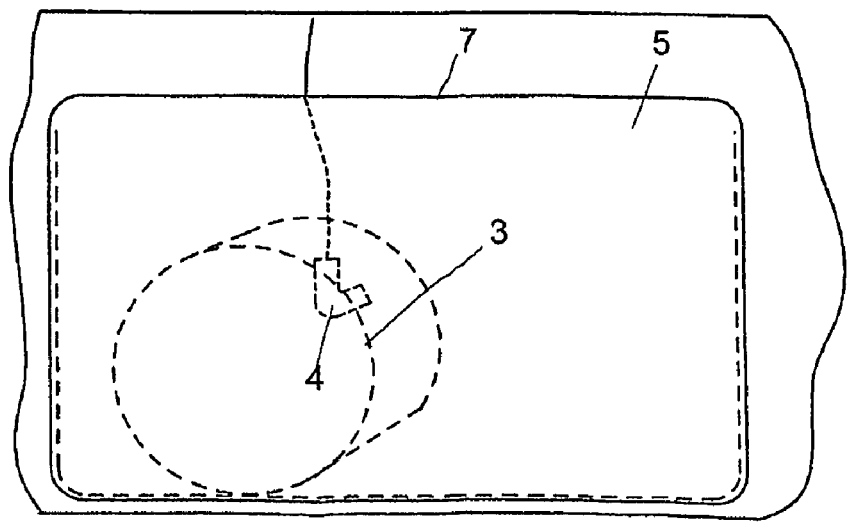
FIG. 4 shows the view B of the airbag arrangement according to FIG. 3.

During the deployment of the airbag 2, the latter is pushed over that section 1a of the tubular gas generator 1 which protrudes beforehand out of said airbag and over the appliance connector 4, as is apparent from FIG. 3. The upper edge 7 of the fabric part 5, which upper edge is previously pressed downward by the tubular gas generator 1, is now pressed into its starting position and the fabric part 5 closes the gas generator opening 3, as is apparent from FIG. 4. Only the connecting cable 10 which is connected to the appliance connector 4 runs outward between the airbag 1 and the fabric part 5. As a consequence of the pressure in the airbag 2 during deployment of the latter, the connecting cable 10 is clamped between said airbag and the fabric part 5 and its outlet point is closed at least virtually in a gastight manner. For the sake of clarity, the airbag 2 and the fabric part 5 are illustrated at a distance in FIG. 3.

Figure 5:
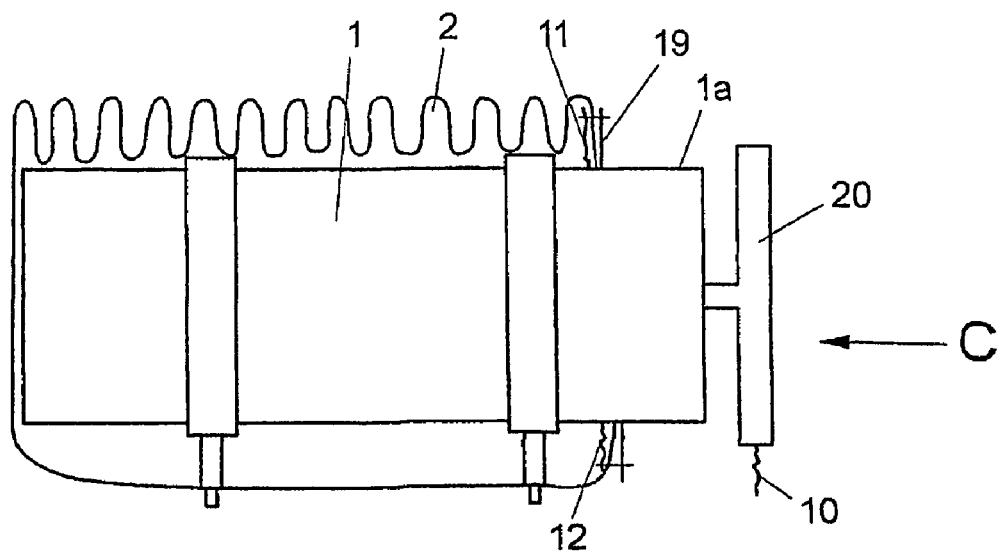
FIG. 5 shows a section through a folded airbag with two fabric parts for covering the gas generator opening, in a first embodiment.
Figure 6:
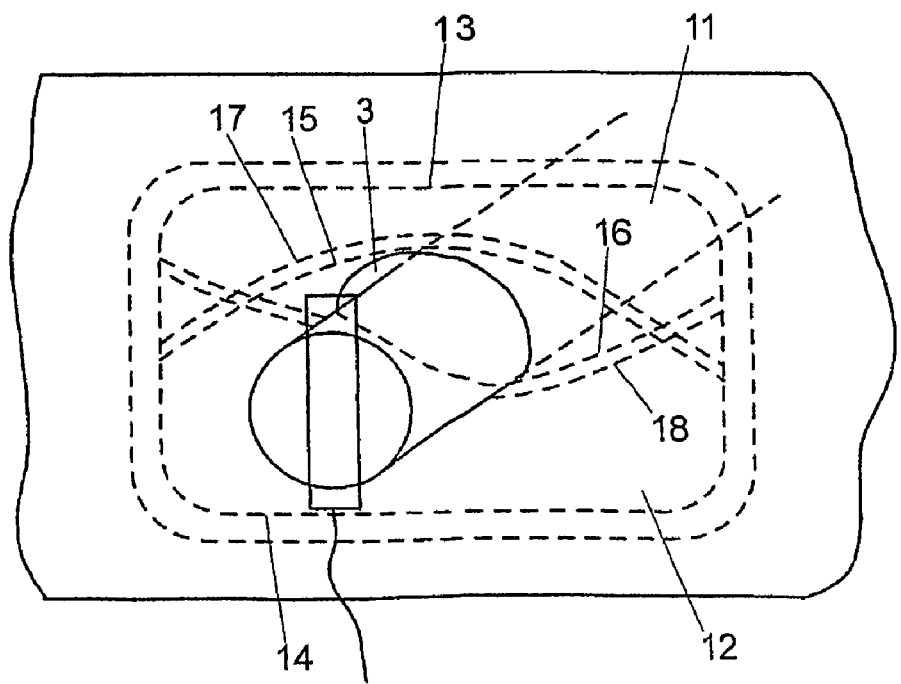
FIG. 6 shows the view C of the airbag arrangement according to FIG. 5.

In the exemplary embodiment of FIG. 5, a section 1a of the tubular gas generator 1 likewise protrudes out of the airbag 2 in the folded position of the latter. In this embodiment, two fabric parts are provided for closing the gas generator opening 3. These fabric parts are fastened to the inside of the airbag. In this case, an upper fabric part 11 is connected at the top and laterally to the airbag by means of seams 13 while a lower fabric part 12 is connected at the bottom and laterally to the airbag by means of seams 14. The lower edge 15 of the fabric part 11 and the upper edge 16 of the fabric part 12 are not connected to the airbag 2, with the result that the tubular gas generator 1 can be pushed between them into the airbag. The two fabric parts overlap, as can be seen from FIGS. 6 to 8. When the tubular gas generator 1 is pushed into the airbag 2, folds 17 therefore form on the upper fabric part 11 and folds 18 on the lower fabric part 12, as is apparent from FIG. 6.

In this embodiment, the airbag 2 has, in the region of the gas generator opening 3, an annular reinforcement 19 which is fitted on the outside of the airbag 2. This reinforcement 19 is assigned an appliance connector 20 which protrudes over the gas generator, as can be seen from FIG. 5.

Figure 7:
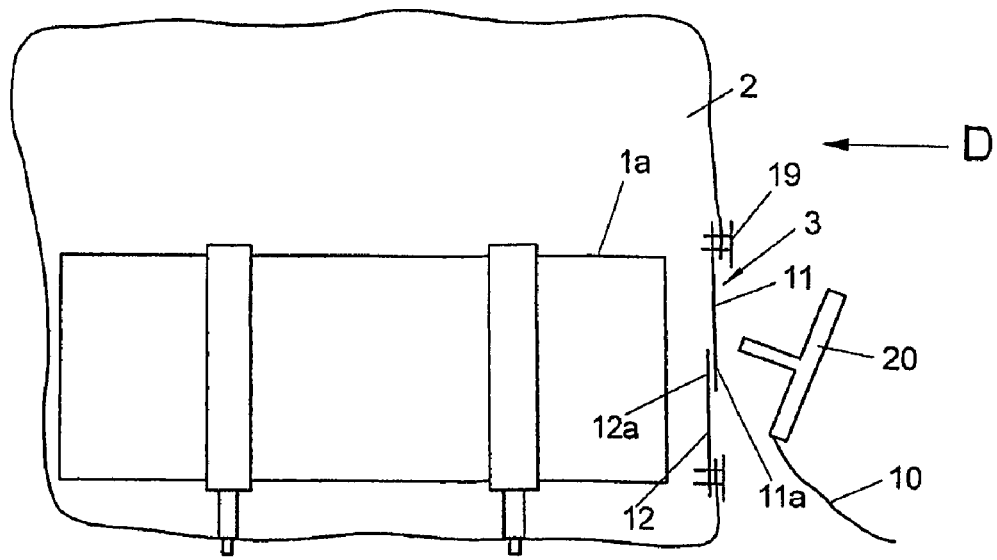
FIG. 7 shows the airbag according to FIG. 5 after deployment of the airbag.
Figure 8:
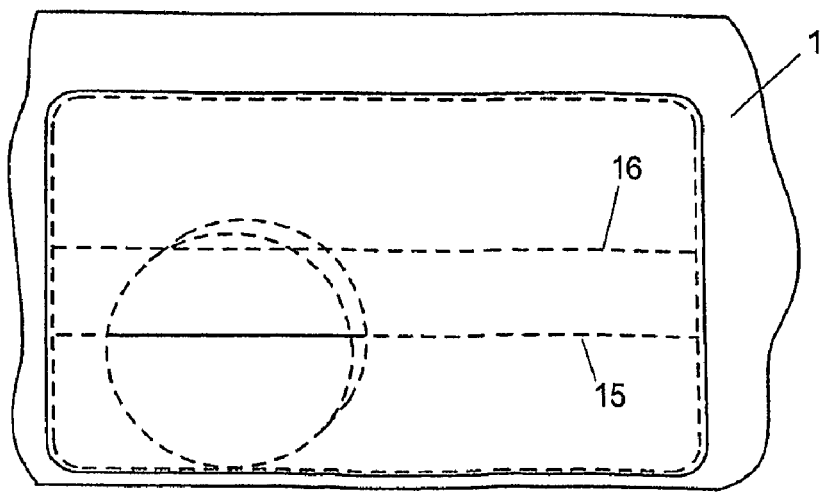
FIG. 8 shows the view D of the airbag arrangement according to FIG. 7.

During deployment of the airbag 2, the latter is pushed over that section 1a of the gas generator 1 which previously protrudes out of said airbag, as is apparent from FIG. 7. Furthermore, the appliance connector 20 is pressed out of the tubular gas generator 1 by means of the reinforcement 19. As a result, the edges 15, 16 of the fabric parts 11, 12, which edges are previously pressed upward or downward by the tubular gas generator, can return into their starting position and close the gas generator opening 3, as can be seen from FIGS. 7 and 8. As a consequence of the increased pressure in the airbag 2 during deployment of the latter, the overlapping section 12a of the fabric part 12 is pressed against the overlapping section 11a of the fabric part 11, so that the airbag 2 is closed at least virtually in a gastight manner.

Figure 9:
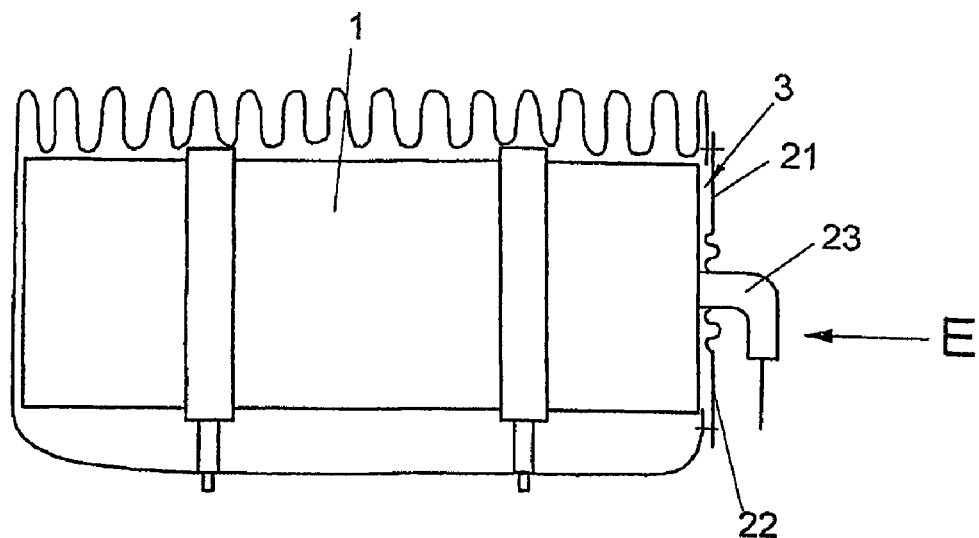
FIG. 9 shows a section through a folded airbag with two fabric parts for covering the gas generator opening, in a second embodiment.
Figure 10:
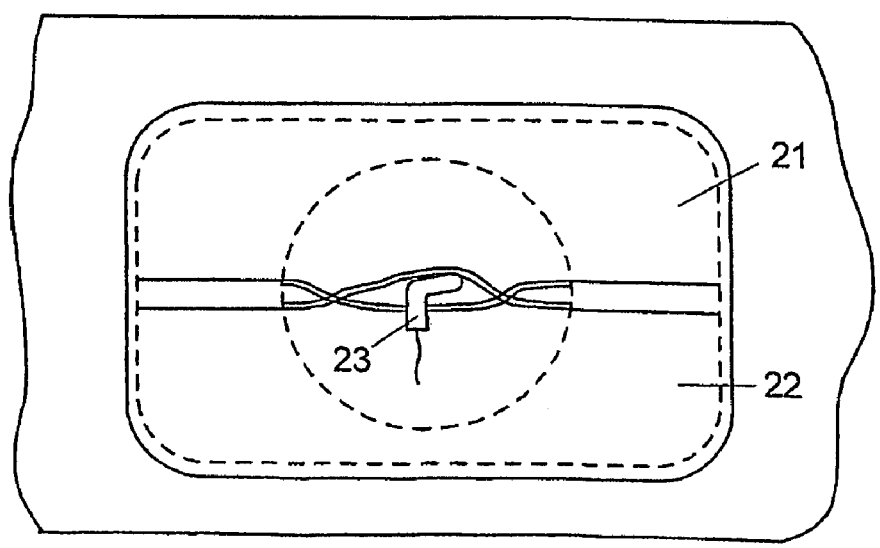
FIG. 10 shows the view E of the airbag arrangement according to FIG. 9.

In the embodiment of FIGS. 9 and 10, as in the preceding embodiment, an upper fabric part 21 and a lower fabric part 22 which overlap are provided. In this embodiment, the gas generator is entirely arranged in the airbag in the folded position of the airbag 2. Only the appliance connector 23 protrudes out of the gas generator opening 3 and the overlapping sections of the fabric parts 21 and 22 bear against the appliance connector 23. FIGS. 9 and 10 show the airbag in the folded position.

When the airbag 2 is deployed, the overlapping sections of the fabric parts 21 and 22 bear tightly against the appliance connector 23, so that the airbag is closed at least virtually in a gastight manner. A separate illustration of this position of the fabric parts has been omitted, since it essentially corresponds to the position illustrated in FIGS. 9 and 10, with the fabric parts 21 and 22 bearing more tightly against the appliance connector 23.

In all of the embodiments illustrated, there is the advantage that the gas generator opening is used both for inserting the gas generator into the airbag and for guiding the electrical connection out.

The Germany Priority Application 20 2005 002 329.9, filed Feb. 9, 2005, including the specification, drawings, claims and abstract, is incorporated herein by reference in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An airbag module, comprising:
   a tubular gas generator including an electrical connection;
   an airbag with a generator opening; and
   at least one fabric part attached to the airbag,
   wherein the gas generator is inserted into the airbag via the generator opening, and a portion of the gas generator protrudes out of the generator opening after installation of the gas generator and when the airbag is in a folded state,
   wherein the module is configured so that the electrical connection protrudes out of the generator opening after installation of the gas generator and when the airbag is in the folded state, and wherein during inflation of the airbag, the portion of the gas generator is contained within the airbag and the at least one fabric part seals the generator, and
   wherein the fabric part includes a sewn seam configured to attach at least a portion of a perimeter of the fabric part to the airbag around the generator opening, the fabric part including one side that is not attached via a sewn seam to the airbag and overlaps the airbag at the generator opening in the inflated state.

2. The airbag module as claimed in claim 1, wherein the electrical connection is provided on the protruding section of the gas generator.

3. The airbag module as claimed in claim 2, wherein the at least one fabric part covering the gas generator opening bears against the electrical connection during and/or after the deployment of the airbag.

* * * * *